US011970268B2

(12) United States Patent
Garanger et al.

(10) Patent No.: US 11,970,268 B2
(45) Date of Patent: Apr. 30, 2024

(54) FRACTAL TETRAHEDRON UNMANNED AIRCRAFT SYSTEM ASSEMBLY

(71) Applicant: Georgia Tech Research Corporation, Atlanta, GA (US)

(72) Inventors: Kevin Garanger, Atlanta, GA (US); Jeremy Epps, Atlanta, GA (US); Eric Feron, Atlanta, GA (US); Michael Miller, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 102 days.

(21) Appl. No.: 17/784,930

(22) PCT Filed: Dec. 14, 2020

(86) PCT No.: PCT/US2020/064892
§ 371 (c)(1),
(2) Date: Jun. 13, 2022

(87) PCT Pub. No.: WO2021/119603
PCT Pub. Date: Jun. 17, 2021

(65) Prior Publication Data
US 2023/0017711 A1    Jan. 19, 2023

Related U.S. Application Data

(60) Provisional application No. 62/947,865, filed on Dec. 13, 2019.

(51) Int. Cl.
*B64C 37/02* (2006.01)
*B64C 25/32* (2006.01)
(Continued)

(52) U.S. Cl.
CPC ............ *B64C 39/024* (2013.01); *B64C 25/32* (2013.01); *B64C 37/02* (2013.01); *B64D 27/24* (2013.01);
(Continued)

(58) Field of Classification Search
CPC ... B64C 39/024; B64C 37/02; B64C 2211/00; B64D 27/24; B64U 30/20; B64U 50/19; B64U 2201/20; B64U 10/13
See application file for complete search history.

(56) References Cited

U.S. PATENT DOCUMENTS

| 770,626 A | 9/1904 | Bell |
| 3,937,426 A | 2/1976 | Pearce |

(Continued)

FOREIGN PATENT DOCUMENTS

| EP | 3 194 265 B1 | 4/2020 |
| GB | 2573536 A | 11/2019 |

(Continued)

OTHER PUBLICATIONS

Ahmadzadeh et al.: Modular robotic systems: Methods and algorithms for abstraction, planning, control, and synchronization:; Feb. 12, 2015; Artificial Intelligence 223; 27-64; Elsevier.

(Continued)

*Primary Examiner* — Justin M Benedik
(74) *Attorney, Agent, or Firm* — Bryan W. Bockhop; Bockhop Intellectual Property Law, LLC

(57) ABSTRACT

A fractal unmanned aircraft system (200) includes a first module (100), a second module (100) and a third module, (100) each having a top member (120) and a first thruster (130) affixed thereto. Each module (100) is laterally coupled to each other. A fourth module (100) has a bottom that is affixed to the top members (120) of the first module (100), the second module (100) and the third module (100) so as to (Continued)

form a tetrahedral structure. A power source (220) supplies power to the first thrusters (130). A control circuit (222) controls the unmanned aircraft system so as to cause the fractal unmanned aircraft system (200) to fly in a controlled manner.

22 Claims, 3 Drawing Sheets

(51) Int. Cl.
  *B64C 39/02* (2023.01)
  *B64D 27/24* (2006.01)
  *B64U 30/20* (2023.01)
  *B64U 50/19* (2023.01)

(52) U.S. Cl.
  CPC .............. *B64U 30/20* (2023.01); *B64U 50/19* (2023.01); *B64U 2201/20* (2023.01)

(56) References Cited

U.S. PATENT DOCUMENTS

| | | | |
|---|---|---|---|
| 9,079,662 B1 * | 7/2015 | Duffy | ...................... B64C 37/02 |
| 9,457,899 B2 | 10/2016 | Duffy et al. | |
| 10,577,098 B2 | 3/2020 | Chang | |
| 2017/0139409 A1 | 5/2017 | Clarke | |
| 2017/0283054 A1 * | 10/2017 | Wang | .................... B64C 39/024 |
| 2019/0048908 A1 | 2/2019 | Benthien et al. | |
| 2019/0127063 A1 * | 5/2019 | Gozluklu | ............... B64U 10/14 |

FOREIGN PATENT DOCUMENTS

| | | |
|---|---|---|
| JP | 6425466 B2 | 11/2018 |
| KR | 10-2017-0017067 | 2/2017 |
| KR | 10-1914960 | 10/2018 |
| KR | 10-1956648 | 6/2019 |
| KR | 10-2020-0116604 | 10/2020 |

OTHER PUBLICATIONS

Raffaello D'Andrea: "Distributed Flight Array"; Nov. 5, 2020; Dynamic Works.

Eth Zurich: (Untitled); (date unknown, admitted prior art); https://youtube/sli80LMLJSY.

UPENN: (Untitled); (date unknown, admitted prior art).

* cited by examiner

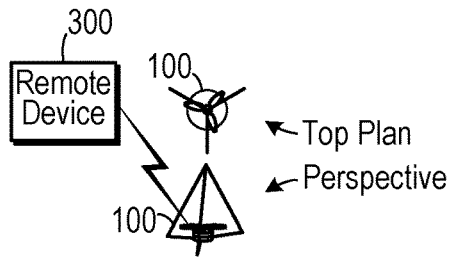
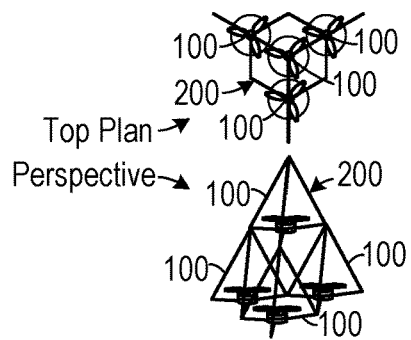
FIG. 3A
FIG. 3B
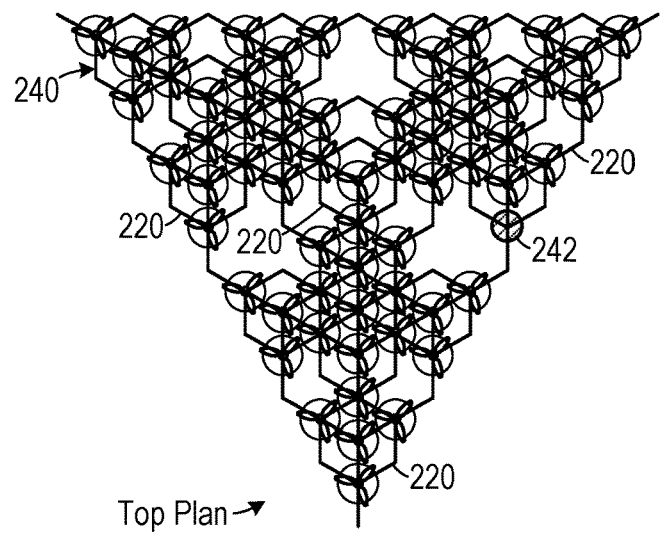
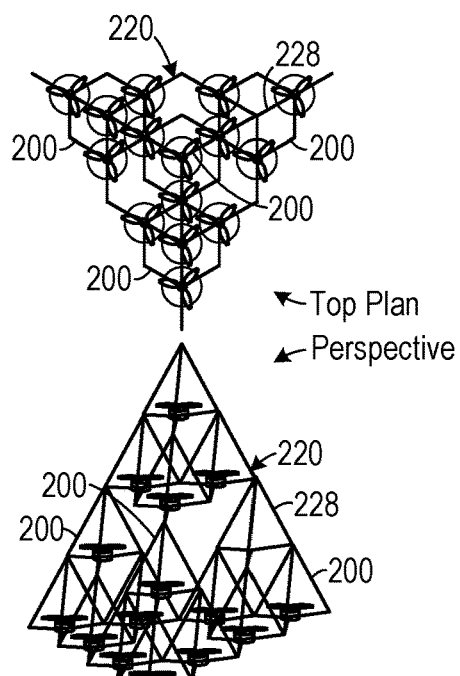
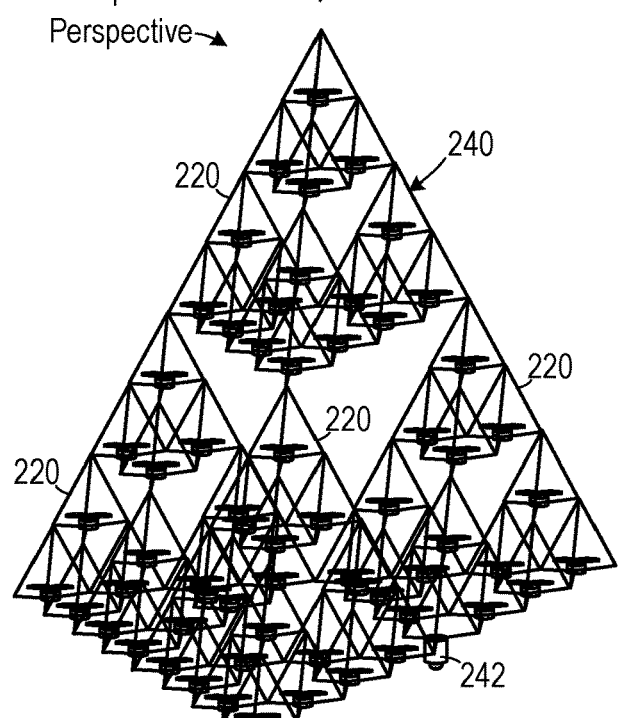
FIG. 3C
FIG. 3D

FRACTAL TETRAHEDRON UNMANNED AIRCRAFT SYSTEM ASSEMBLY

CROSS-REFERENCE TO RELATED APPLICATION(S)

This application claims the benefit of U.S. Provisional Patent Application Ser. No. 62/947,865, filed Dec. 13, 2020, the entirety of which is hereby incorporated herein by reference.

BACKGROUND OF THE INVENTION

1. Field of the Invention

The present invention relates to unmanned aircraft systems and, more specifically, to a scalable three-dimensional unmanned aircraft system employing.

2. Description of the Related Art

Unmanned aircraft systems (UASs), often referred to as "drones," usually include a frame onto which several thrusters, a control circuit and a power source are mounted. The thrusters usually include a motor-driven rotor that is powered by the power source. The majority of multi-rotor aircraft are structured so that their rotors lie on the same plane. This is done for efficiency in flight, control, and simplicity in design and fabrication.

Attempts have been made to make scalable multi-rotor single plane distributed flight arrays by assembling a plurality of single-rotor modules along a common plane. Adding more thrusting modules to a planar array can increase the lifting power of the resulting array that is capable of lifting heavier loads or travelling faster, as there is a near linear correspondence between the number of modules and the total thrust of the resulting array.

However, such planar distributed flight arrays can become internally unstable as the number of modules in an array increases. In a modular array that includes many modules, external forces can cause local deformations and create high internal stress leading to structural mechanical failure of the array. This can be especially problematic when lifting heavy payloads or when flying in turbulent air.

Therefore, there is a need for a need for a scalable modular flight array that remains structurally sound as modules are added.

SUMMARY OF THE INVENTION

The disadvantages of the prior art are overcome by the present invention which, in one aspect, is an aircraft system that includes at least one first module having a first thruster affixed thereto. At least a second module, a third module and a fourth module are coupled together to form a tetrahedral shaped structure. A power source that supplies power to the thruster. A control circuit that controls the thruster.

In another aspect, the invention is a fractal unmanned aircraft system that includes a first module having a top member and a first thruster affixed thereto. A second module has a top member and a second thruster affixed thereto and is laterally coupled to the first module. A third module has a top member and a third thruster affixed thereto and is laterally coupled to the first module and the second module. A fourth module has a bottom that is affixed to the top members of the first module, the second module and the third module so that the first module, the second module, the third module and the fourth module form a tetrahedral structure. A power source supplies power to the first thruster, the second thruster and the third thruster. A control circuit controls the unmanned aircraft system so as to cause the fractal unmanned aircraft system to fly in a controlled manner.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 3A is a top schematic view and a perspective view of a single module for use in an aircraft system.

FIG. 3B is a top schematic view and a perspective view of a four-module aircraft system.

FIG. 3C is a top schematic view and a perspective view of a 16-module aircraft system.

FIG. 3D is a top schematic view and a perspective view of a 64-module aircraft system.

DETAILED DESCRIPTION OF THE INVENTION

Figure 1:
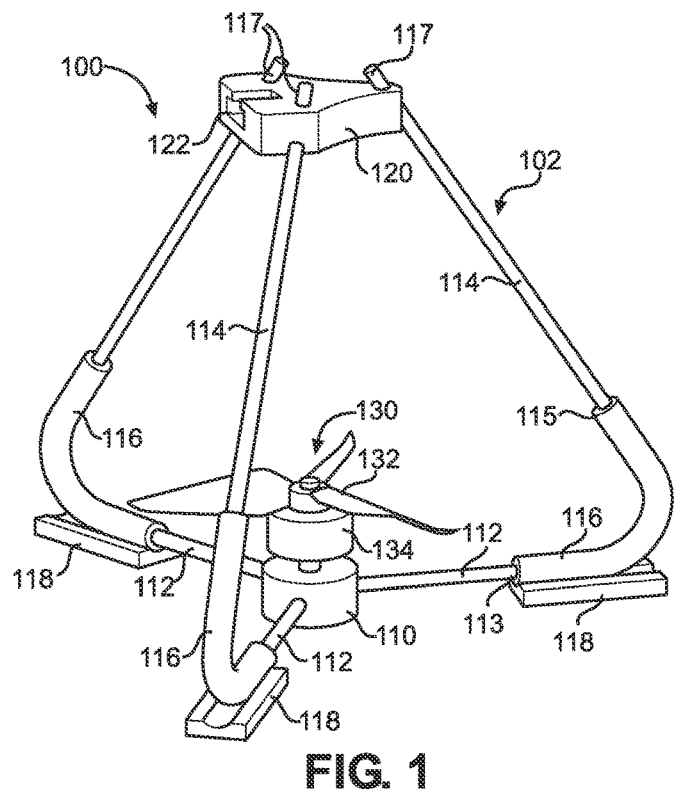
FIG. 1 is a perspective view of one embodiment of a module for use in an aircraft system.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one example of a module 100 that can be assembled into a fractal tetrahedral unmanned aircraft system includes a central member 110 that supports a thruster 130. In one embodiment, the thruster 130 includes a rotor 132 (which can include a multi-bladed propeller) that is driven by a motor 134 (such as a battery-powered electric motor). Three legs 112 extend radially outwardly from the central member 110 to a distal end 113. Three trusses 114 each have a bottom end 115 and an opposite top end 117. The bottom end 115 of each truss 114 is coupled to the distal end 113 of a corresponding leg 112 with a coupler 116. The top ends 117 of the trusses 114 are coupled to each other by a top member 120.

One experimental embodiment was constructed to demonstrate that the vehicle would fly in the given configuration. The goal of the prototype was to hover out of ground effect without any noticeable instabilities that could not be repaired through tuning the proportional-integral-derivative (PID) gains on a PID flight controller used to control the vehicle.

The frame 102 of the single-propeller module 100 has the shape of a regular tetrahedron, meaning that each face of the tetrahedron is an equilateral triangle of the same area. The module 100 can be made in non-tetrahedral shapes. The legs 112 and trusses 114 of the single-propeller module 100 were fabricated using several 3D printed couplers 116 and 5 mm carbon fiber tubes. The design and materials used to build the experimental prototype were meant to minimize blocking the inflow of the rotor 132 as well as reduce the occupied space directly underneath each rotor.

Figure 2:
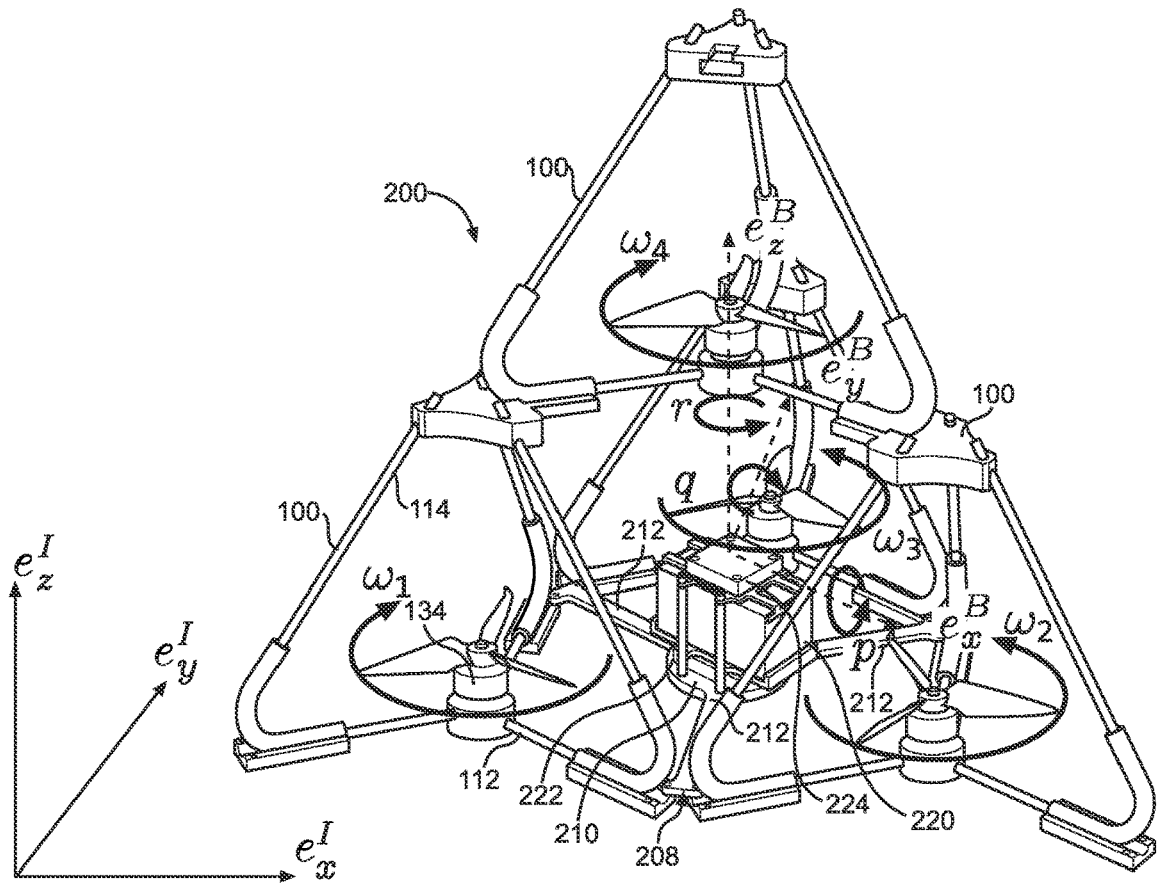
FIG. 2 is a perspective view of one embodiment of an aircraft system that includes four modules.

As shown in FIGS. 1 and 2, an assembly of four of the tetrahedral rotorcraft modules 100 results in a stable rotorcraft aircraft system 200. The single-propeller modules are attached by sliding the feet 118 of the module 100 into the top connecting piece 117 of a lower module 100. The pieces are then bolted together. This method is used to attach each single-propeller module to create the Tetrahedron quad rotorcraft 200. In the center of the Tetrahedron quad-rotorcraft aircraft system 200 is a frame 208 with a 3D printed plate central member 210 from which three extensions 212 extend, which are coupled to the feet 118 of the modules 100. The central member 210 supports a battery 220, a power distribution board 224, and a flight control circuit 222. The electronics of the control circuit 222 can be positioned close to the center of gravity of the rotorcraft 200 for control purposes. The control circuit 222 includes a wireless communications chipset for receiving commands from a remote controller device and, in some embodiments, for communicating with other modules and with the controller. The single-propeller modules 100 are attached to central member 210.

In one embodiment, the legs 112, the trusses 114, the couplers 116 and the central member 210 can include a wiring system used to distribute power from the battery 220 to the motors 134. The top members 120 of the modules 100 include a coupling 122 that is complimentary in shape to the foot 118 of each of the couplers 116. The coupling 122 and each foot 118 includes electrical contacts that electrically couple the coupler of a leg 112 of one module to the top member 120 of another module 100, thereby allowing the modules 100 to be stacked to form a tetrahedral rotorcraft 200.

The electronics used in the experimental embodiment were of a type commonly used in conventional quadrotors. The Tetrahedron quad-rotorcraft used four HQProp Ethix S5 5×4×3 rotors and Emax Eco 2306 2400kv motors. A CC3D flight controller along with four HAKRC BLHeli-32 Bit 35A 2-5s electronic speed controllers were used to control the motors.

In one experimental embodiment, each single-propeller module has a battery and all of the necessary electronics to fly. In such an embodiment, the control circuit is programmed to determine where the module is in relation the other modules and then to generate control commands to its rotor based on the overall commands issued by a controller and the location of the module in the tetrahedral rotorcraft aircraft system 200.

Figure 4:
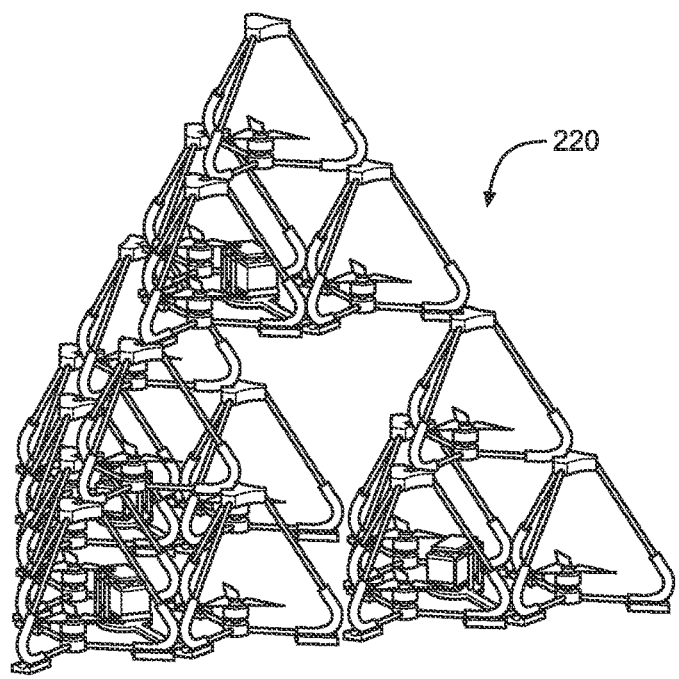
FIG. 4 is a perspective view of a 16-module system.

Both a perspective view and a top plan view of a single module 100 is shown in FIG. 3A. The module can include its own control circuit with a wireless chipset, allowing it to be controlled by a remote-control device 300. Four of these modules are combined to form quad a tetrahedral rotorcraft 200, as shown in FIG. 3B. This system can be scaled, as shown in FIG. 3C, to form a 16-module rotorcraft aircraft system 220. (A perspective view of a model of such a system is shown in FIG. 4.) Also, not all of the modules have to include rotors; for example, module 228 is a structural module used to add necessary structure to the rotorcraft 220. The system can be scaled further, as shown in FIG. 3D, to form a 64-module rotorcraft aircraft system 240. Additionally, items such as cameras 242 and other sensors, as well as payloads for delivery, can be supported by the modules. The resulting rotorcraft configurations can either have a central control circuit or each module can have its own control circuit that is programmed to respond to commands from a remote control unit 300 in a coordinated manner.

As shown in the top plan views of FIGS. 3B-3D, as the rotorcraft is scaled up with increasing numbers of modules, the tetrahedral configuration minimizes the interference of thrust from the rotors of the different modules. This is because in the tetrahedral configuration, no rotor is directly on top of another rotor. As a result, one can increase the total thrust of a rotorcraft configuration while ensuring that the configuration is structurally sound while maintaining efficiency as rotors do not interfere with each other.

Figure 5:
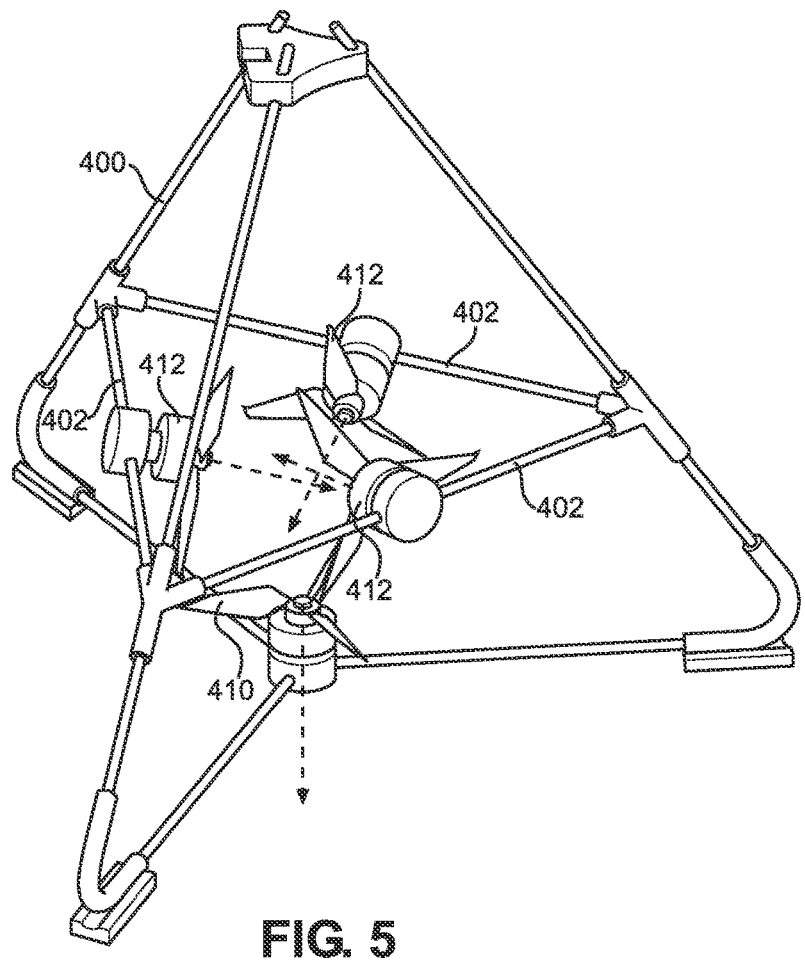
FIG. 5 is a perspective view of one embodiment of an aircraft system that includes thrusters with non-parallel force vectors.

As shown in FIG. 5, the modules can include several rotors with non-parallel trust vectors. In the embodiment shown, a module 400 can include intermediate braces 402 that are affixed to the trusses, support additional rotors 412. The additional rotors 412 can direct thrust that is transverse to the upward thrust of the central rotor 410. Also, a multi-module rotorcraft can include one or more modules that direct thrust transversely to the upward thrust vectors of the lift thrusters so as to provide better attitude control of the rotorcraft.

Returning to FIG. 2, in modeling a quad rotorcraft 200, the tetrahedron quad-rotorcraft is represented as a rigid body and its dynamics are derived with the Newton-Euler equations. The derivation of the nonlinear dynamic equations does not differ much from the derivations found in papers that model flat quad-copters. However, the Tetrahedron quad-rotorcraft 200 has fewer planes of symmetry than a typical quadcopter, which prevents the common assumption of a diagonal inertia matrix of the rigid body. The particular placement of the rotors also implies a different expression of the torque induced by the differential thrust. Consider an inertial reference frame and a body-fixed frame as shown on FIG. 2. The position and orientation of the body-fixed frame in the inertial frame is given by the translation vector 4 and the Euler angles η defined by equations 1 and 2 below:

$$\xi = \begin{bmatrix} x \\ y \\ z \end{bmatrix} \tag{1}$$

$$\eta = \begin{bmatrix} \phi \\ \theta \\ \psi \end{bmatrix} \tag{2}$$

The rotation matrix from the inertial frame to the body-fixed frame is given by equation 3, where the sines and cosines are abbreviated, as follows:

$$R = \begin{bmatrix} c_\psi c_\theta & c_\psi s_\theta s_\phi - s_\psi c_\phi & c_\psi s_\theta c_\phi + s_\psi s_\phi \\ s_\psi c_\theta & s_\psi s_\theta s_\phi + c_\psi c_\phi & s_\psi s_\theta c_\phi - c_\psi s_\phi \\ -s_\theta & c_\theta s_\phi & c_\theta c_\phi \end{bmatrix} \tag{3}$$

The body-fixed frame has linear velocity $V^B = [u, v, w]$ and angular velocity $\Omega = [p, q, r]$.

The transformation matrix S is used to obtain the angular velocities in the inertial frame from the angular velocities in the body-fixed frame, as shown in equation 4.

$$\Omega = S\dot{\eta} = \begin{bmatrix} 1 & 0 & -s_\theta \\ 0 & c_\phi & c_\theta s_\phi \\ 0 & -s_\phi & c_\theta c_\phi \end{bmatrix} \begin{bmatrix} \dot{\phi} \\ \dot{\theta} \\ \dot{\psi} \end{bmatrix} \quad (4)$$

The forces acting on the Tetrahedron quad-rotorcraft 200 in the body-fixed frame are gravity, the thrust of the four rotors, and air drag. Their sum is equal to the centrifugal force and the derivative of the linear momentum in the body-fixed frame, as given in equation 5:

$$m\dot{V}^B + \Omega \times (mV^B) = mR^T G + T - \begin{bmatrix} k_x u^2 \\ k_y v^2 \\ k_z w^2 \end{bmatrix}. \quad (5)$$

The scalars $k_x$, $k_y$, and $k_z$ are drag coefficients.
The thrust produced by the rotors can be written:

$$T = k_T \begin{bmatrix} 0 \\ 0 \\ \omega_1^2 + \omega_2^2 + \omega_3^2 + \omega_4^2 \end{bmatrix} \quad (6)$$

where $k_T$ is a coefficient that depends on the ambient air density and the rotor blades' characteristics and $\omega_j$ is the angular velocity of rotor j.

The angular velocity in the body-fixed frame $\Omega$ is given by the Euler's equation for a rigid body $$M = I_q \dot{\Omega} + \Omega \times (I_q \Omega) \quad (7)$$

where $I_q$ is the inertia tensor of the Tetrahedron quadrotorcraft and M the applied torques. The applied torques include:
- $M_j$ for $j \in 1, 2, 3, 4$, the counteracting torques induced on the four stators by spinning the rotor;
- $M^T$, the torques induced by the differential thrust of the rotors;
- $M^D$ the drag torque induced by the rotation of the quadrotorcraft around $\Omega$.

For a rotor j, $M_j$ can be determined with Euler's equation applied to the rotor in the body-fixed frame:

$$-M_j + M_j^d + M_j^f = I_r \Omega \times \omega_j \quad (8)$$

where we use:
- $M_j^d$, the drag torque induced by the rotation of the rotor;
- $M_j^f$, the friction torque of the rotor with the stators;
- $I_r$, the inertia of a rotor around its rotation axis.

Since rotors 1 and 3 rotate counter-clockwise and rotors 2 and 4 rotate clockwise, $$\omega_j = (-1)^{j+1} \omega_j e_z^B, \quad (9)$$

$$M_j^d = (-1)^j k_D \omega_j^2 e_z^B, \quad (10)$$

and $$M_j^f = (-1)^j k_F \omega_j e_z^B \quad (11)$$

where $k_D$ and $k_F$ are respectively a drag and a friction constant.

Combining 8, 9, 10, and 11 gives $$M_j = (-1)^j \begin{bmatrix} I_r \omega_j q \\ -I_r \omega_j p \\ I_r \dot{\omega}_j + k_D \omega_j^2 + k_F \omega_j \end{bmatrix}. \quad (12)$$

The torque induced by the drag on the quad-rotorcraft 200 is given by equation 13, where $k_p$, $k_q$, and $k_r$ are drag coefficients.

$$M^D = -\begin{bmatrix} k_p p^2 \\ k_q q^2 \\ k_r r^2 \end{bmatrix}. \quad (13)$$

Equation 14, below, gives the torque induced by the differential thrust of the rotors in which a is the length of the side of tetrahedral frame and the assumption is made that the z-axis intersects the base of the tetrahedron formed by the quad-rotorcraft in its center.

$$M^T = ak_T \begin{bmatrix} (\omega_3^2 - \omega_1^2)/4 \\ ((\omega_1^2 + \omega_3^2)/2 - \omega_2^2)/(2\sqrt{3}) \\ 0 \end{bmatrix}. \quad (14)$$

By replacing M by $\Sigma_{j=1}^4 M_j + M^T + M^D$ in equation 7, we obtain $$\dot{\Omega} = I_\eta^{-1} \left( \sum_{j=1}^4 (-1)^j \begin{bmatrix} I_r \omega_j q \\ -I_r \omega_j p \\ I_r \dot{\omega}_j + k_D \omega_j^2 + kp\omega_j \end{bmatrix} - \begin{bmatrix} k_p p^2 \\ k_q q^2 \\ k_r r^2 \end{bmatrix} + ak_T \begin{bmatrix} (\omega_3^2 - \omega_2^2)/4 \\ ((\omega_1^2 + \omega_3^2)/2 - \omega_2^2)/(2\sqrt{3}) \\ 0 \end{bmatrix} - \Omega \times (I_q \Omega) \right). \quad (15)$$

Linearized dynamics: To derive a stabilizing control law at hover, we can linearize the nonlinear dynamics around $\theta = 0$, $\Omega = [0, 0, 0]$ and $V^B = [0, 0, 0]$. $\varphi$ and $\psi$ can also be assumed equal to zero without loss of generality. We write:

$$\omega_j = \omega_0 + \Delta \omega_j$$

where $\omega_0 = \sqrt{mg/(4k_r)}$ so that $T + mG = 0$
Linearizing 4 gives $$\begin{bmatrix} \dot{\phi} \\ \dot{\theta} \\ \dot{\psi} \end{bmatrix} = \begin{bmatrix} p \\ q \\ r \end{bmatrix} \quad (16)$$

while we also have $$\begin{bmatrix} \dot{x} \\ \dot{y} \\ \dot{z} \end{bmatrix} = \begin{bmatrix} u \\ v \\ w \end{bmatrix}. \quad (17)$$

Equation 5 becomes $$\begin{bmatrix} \dot{u} \\ \dot{v} \\ \dot{w} \end{bmatrix} = \begin{bmatrix} g\theta \\ -g\phi \\ \frac{2k_r\omega_0}{rn}\sum_{k=1}^{4}\Delta\omega_j \end{bmatrix} \quad (18)$$

and equation 15 becomes $$\begin{bmatrix} \dot{p} \\ \dot{q} \\ \dot{r} \end{bmatrix} = I_q^{-1}\left(\sum_{j=1}^{4}(-1)^j \begin{bmatrix} I_r\omega_0 q \\ I_r\omega_0 p \\ (2k_D\omega_0 + k_F)\Delta\omega_j \end{bmatrix} + ak_r\begin{bmatrix} (\omega_0\Delta\omega_3 - \omega_0\Delta\omega_2)/2 \\ ((\omega_0\Delta\omega_1 + \omega_0\Delta\omega_3)/2 - \omega_0\Delta\omega_2)/\sqrt{3} \\ 0 \end{bmatrix}\right) \quad (19)$$

where the term $I_r\Delta\dot{\omega}_j$ has been neglected.

Equations 16-19 can be combined and rewritten as $$\begin{bmatrix} \dot{x} \\ \dot{y} \\ \dot{z} \\ \dot{\phi} \\ \dot{\theta} \\ \dot{\psi} \\ \dot{u} \\ \dot{v} \\ \dot{w} \\ \dot{p} \\ \dot{q} \\ \dot{r} \end{bmatrix} = A\begin{bmatrix} x \\ y \\ z \\ \phi \\ \theta \\ \psi \\ u \\ v \\ w \\ p \\ q \\ r \end{bmatrix} + B\begin{bmatrix} \Delta\omega_1 \\ \Delta\omega_2 \\ \Delta\omega_3 \\ \Delta\omega_4 \end{bmatrix}. \quad (20)$$

Control of the tetrahedral quad-rotorcraft: The linearized equation of motion can be used to derive a stabilizing feedback control law around the equilibrium point. For the prototype of the tetrahedral quad-rotorcraft, a PID controller based on the reduced state [w; p; q; r] can be employed. In order to choose the 16 proportional gains, the 4×4 gain matrix K is considered and chosen so that A−BK is Hurwitz. The derivative and integral gains are then chosen empirically to achieve smooth hovering.

A detailed analysis around different equilibrium points could be performed to derive a more sophisticated and robust control law stabilizing the rotorcraft around different attitudes.

Using systems of this type, flight could occur over long distances, and then assembly could happen on the ground for later heavy-duty flight. This could be particularly useful in hard-to-reach locations like in mountains or forests. All that would be required would be a relatively flat and stable location, such as a meadow or a flat terrain, to assemble the system. In this way, there would be no need for a truck to bring the elements, which would fly themselves to the operational location instead.

Because the systems are configured from modules, in one embodiment the modules can be configured to self-assemble while in flight. This may be one way to comply with FAA regulations that impose maximum weight limitations for drones over certain areas (such as high-density populated areas) during aircraft in-flight travel times, while being able to assemble and operate as a "heavy duty machine" once the system reaches an operational destination in which the FAA does not impose such limitations.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An aircraft system, comprising:
   (a) at least one first module that includes a first thruster affixed thereto;
   (b) at least a second module, a third module and a fourth module, wherein the first module, the second module, the third module and the fourth module are coupled together to form a tetrahedral shaped structure;
   (c) a power source that supplies power to the thruster; and
   (d) a control circuit that controls the thruster.

2. The aircraft system of claim 1, wherein a selected three of the first module, the second module, the third module and the fourth module are coupled together so that they are assembled on a common plane and a remaining one of the first module, the second module, the third module and the fourth module is coupled to the other modules and is disposed on a plane that is parallel to and above the common plane.

3. The aircraft system of claim 1, wherein the at least one first module includes an electric motor and wherein the first thruster comprises a rotor driven by the electric motor.

4. The aircraft system of claim 1, wherein the first module includes:
   (a) a central member that supports the first thruster;
   (b) three legs extending radially outwardly from the central member along a common plane, each leg including a distal end; and
   (c) three trusses each having a bottom end coupled to a distal end of a different leg and a top end, wherein the top ends of each of the trusses are coupled to each other at the top member of the module.

5. The aircraft system of claim 1, further comprising a frame that includes:
(a) a central member;
(b) a first extension extending radially from the central member and coupling the first module to the second module;
(c) a second extension extending radially from the central member and coupling second module to the third module; and
(d) a third extension extending radially from the central member and coupling the third module to the first module.

6. The aircraft system of claim 5, wherein the power source comprises a battery affixed to the central member and further comprising a wiring system that delivers power from the battery to at least one selected one of the first module, the second module, the third module and the fourth module.

7. The aircraft system of claim 1, wherein the second module includes a second thruster and wherein the control circuit includes a first portion that is disposed on the first module and a second portion that is disposed on the second module.

8. The aircraft system of claim 7, wherein the second portion of the control circuit that is disposed on the second module is programmed to determine a position of the second module relative to the first module.

9. A fractal unmanned aircraft system, comprising:
(a) a first module having a top member and a first thruster affixed thereto;
(b) a second module having a top member and a second thruster affixed thereto and laterally coupled to the first module;
(c) a third module having a top member and a third thruster affixed thereto and laterally coupled to the first module and the second module;
(d) a fourth module having a bottom that is affixed to the top members of the first module, the second module and the third module so that the first module, the second module, the third module and the fourth module form a tetrahedral structure;
(e) a power source that supplies power to the first thruster, the second thruster and the third thruster; and
(f) a control circuit that controls the unmanned aircraft system so as to cause the fractal unmanned aircraft system to fly in a controlled manner.

10. The fractal unmanned aircraft system of claim 9, wherein the fourth module has a fourth thruster affixed thereto, the fourth thruster being powered by the power source and controlled by the control circuit.

11. The fractal unmanned aircraft system of claim 10, wherein at least one of the first module, the second module, the third module and the fourth module includes:
(a) a central member that supports a thruster;
(b) three legs extending radially outwardly from the central member along a common plane, each leg including a distal end; and
(c) three trusses each having a bottom end coupled to a distal end of a different leg and a top end, wherein the top ends of each of the trusses are coupled to each other at the top member of the module.

12. The fractal unmanned aircraft system of claim 11, wherein the first thruster, the second thruster and the third thruster each include:
(a) an electric motor mounted on the central member; and
(b) a rotor affixed to the electric motor so as to be driven thereby.

13. The fractal unmanned aircraft system of claim 12, wherein each of the three legs terminates in a coupler and further comprising a wiring system that electrically couples the motor to the coupler.

14. The fractal unmanned aircraft system of claim 13, wherein each of the three trusses includes a wiring system that is electrically coupled to the coupler and top member of the module.

15. The fractal unmanned aircraft system of claim 14, wherein the top member of the first module, the second module and the third module each includes a coupling that is complimentary in shape to the coupler affixed to one of the legs of the fourth module, the coupling including electrical contacts that electrically couple the coupler of a leg of the fourth module to the top member of each of the first module, the second module and the third module.

16. The fractal unmanned aircraft system of claim 9, further comprising a frame that includes:
(a) a central member;
(b) a first extension extending radially from the central member and coupling the first module to the second module;
(c) a second extension extending radially from the central member and coupling second module to the third module; and
(d) a third extension extending radially from the central member and coupling the third module to the first module,
wherein the power source comprises a battery affixed to the central member.

17. The fractal unmanned aircraft system of claim 16, wherein the control circuit is affixed to the central member.

18. The fractal unmanned aircraft system assembly of claim 9, wherein at least one of the first module, the second module, the third module and the fourth module includes a battery affixed thereto that supplies power thereto.

19. The fractal unmanned aircraft system assembly of claim 9, wherein at least one of the thrusters has a thrust vector that is not parallel to at least one other one of the thrusters.

20. The fractal unmanned aircraft system of claim 9, wherein the control circuit comprises:
(a) a wireless chipset that receives control information from a remote device; and
(b) a processor programmed to receive control information and generate control commands used to control the thrusters.

21. The fractal unmanned aircraft system assembly of claim 9, further comprising a sensor affixed to a selected module.

22. A unmanned aircraft assembly comprising at least four systems according to claim 9.

* * * * *